Figure 1:
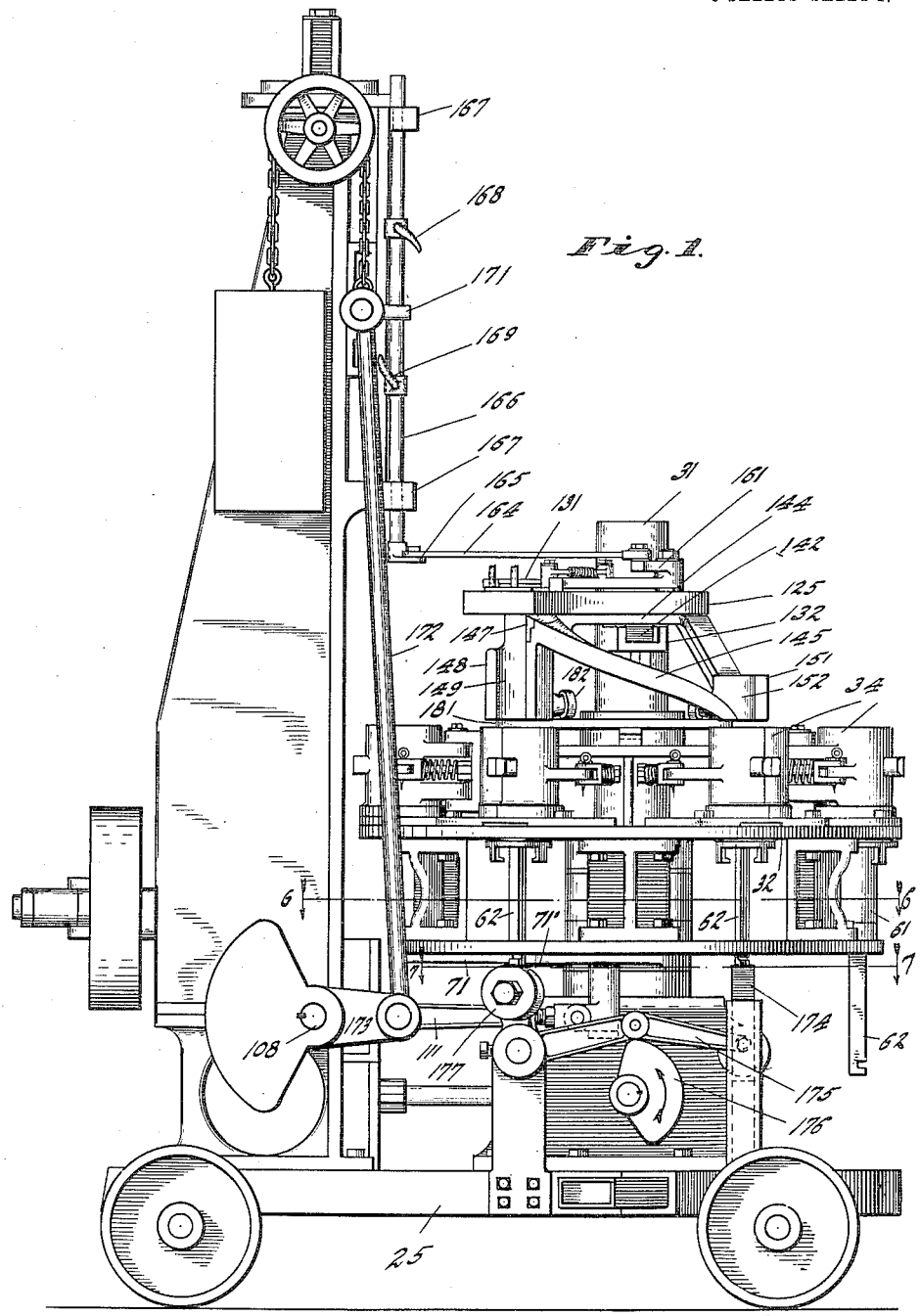

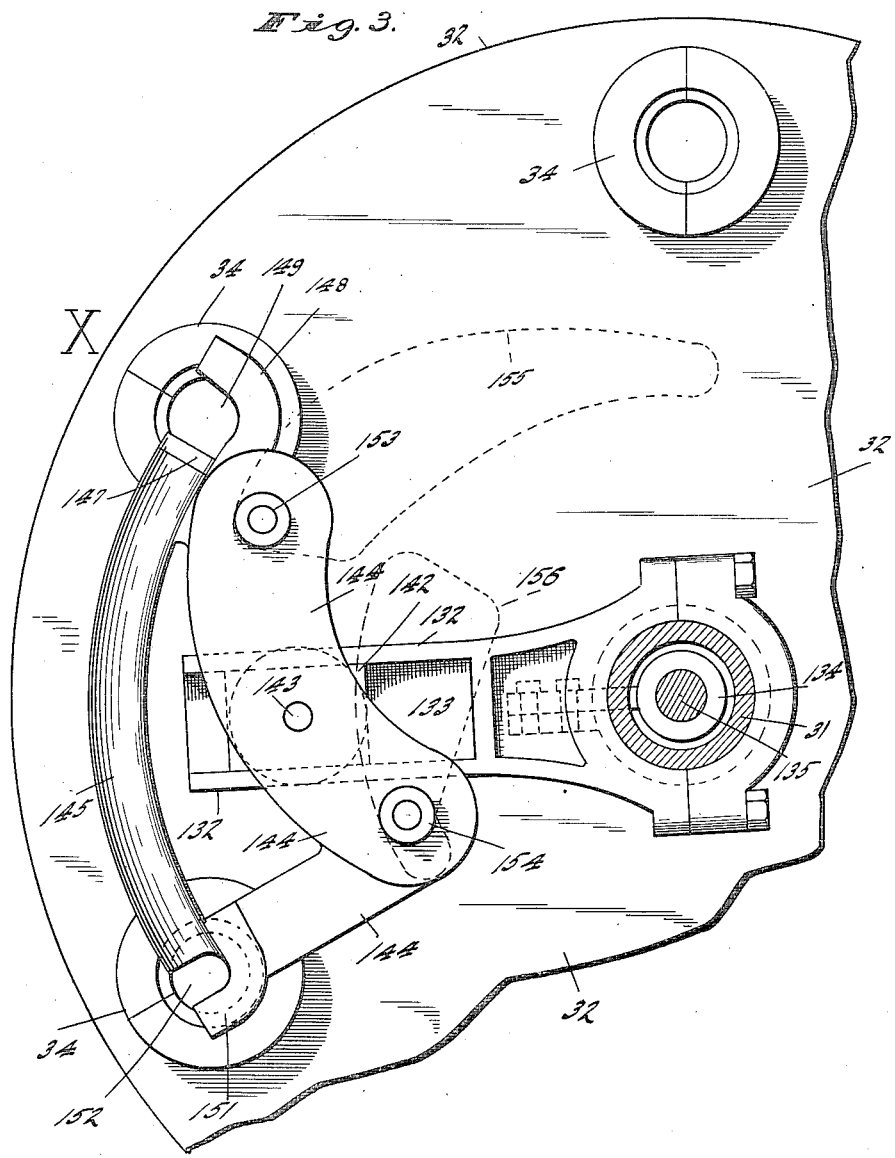

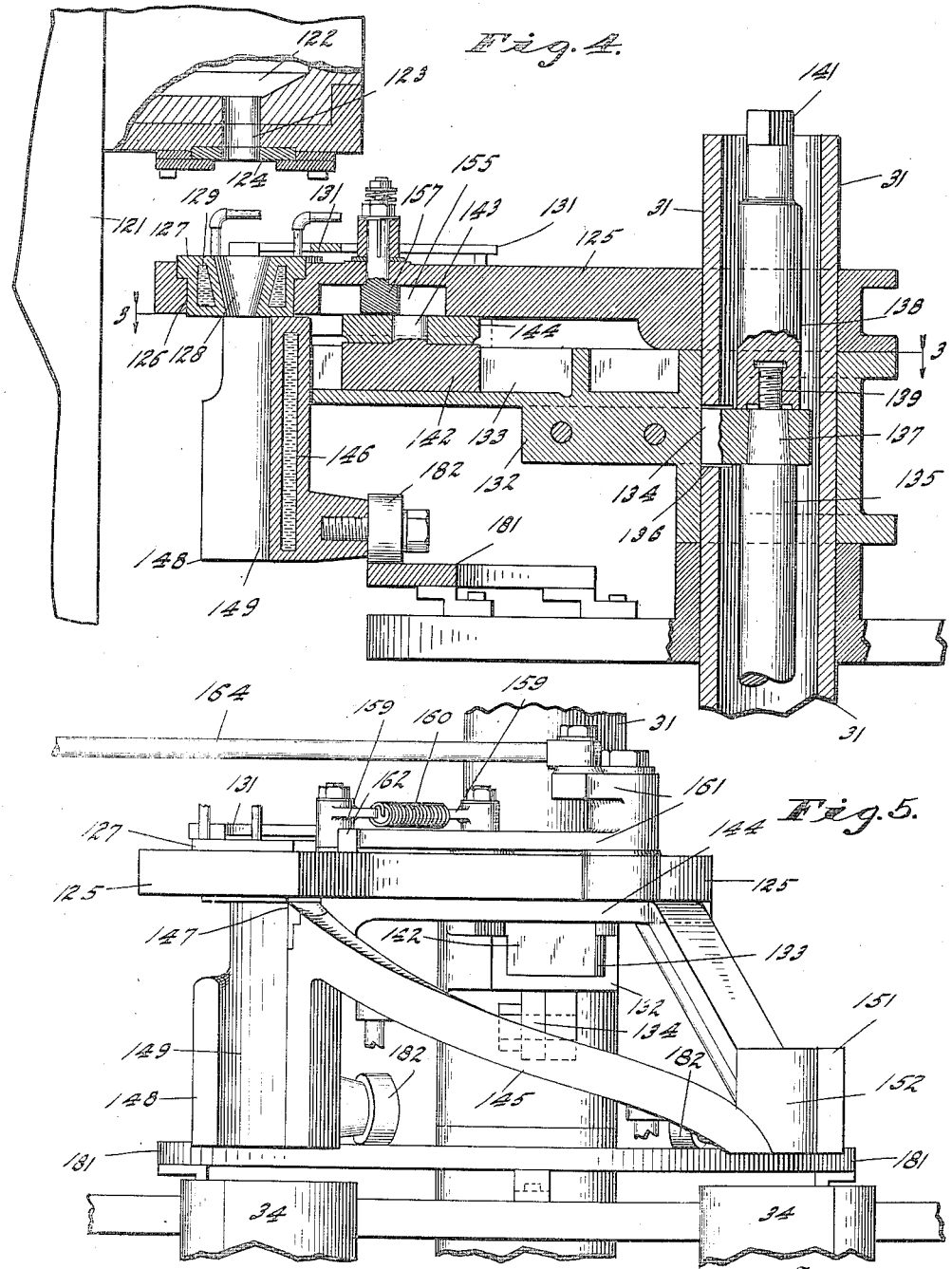

A. L. BINGHAM.
GLASS WORKING MACHINE.
APPLICATION FILED JAN. 14, 1910.
971,587.
Patented Oct. 4, 1910.
5 SHEETS—SHEET 5.
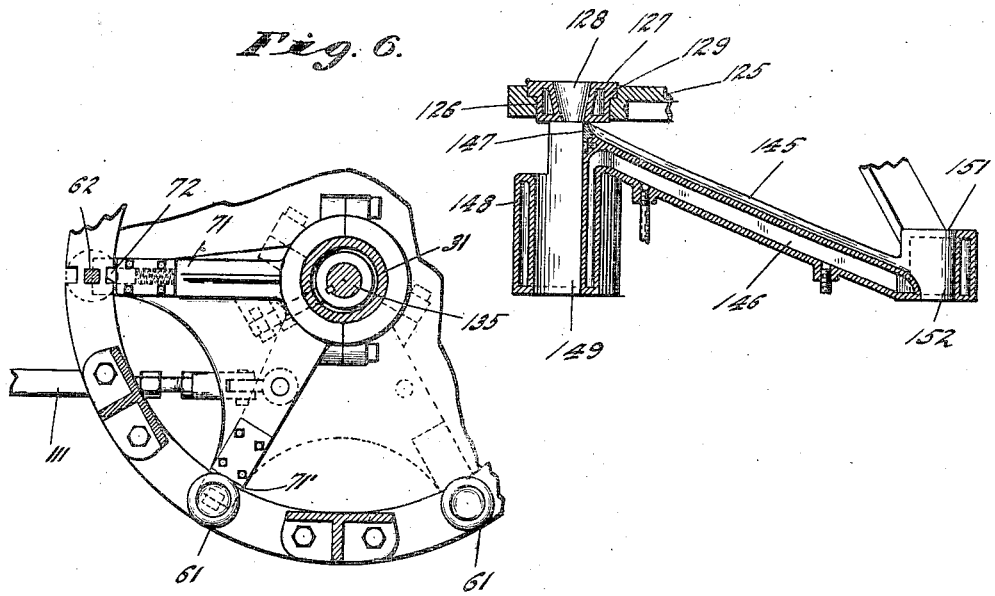
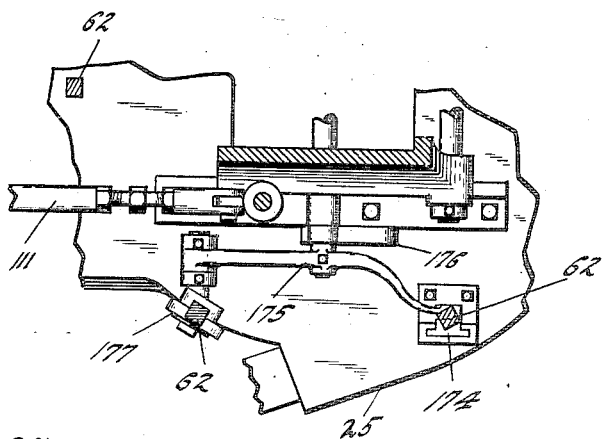
Witnesses
Frank A. Fahle
Thomas W. McMeans
Inventor
Alvah L. Bingham,
By Bradford Hood
Attorneys

UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-WORKING MACHINE.

971,587.   Specification of Letters Patent.   Patented Oct. 4, 1910.

Application filed January 14, 1910. Serial No. 538,014.

*To all whom it may concern:*

Be it known that I, ALVAH L. BINGHAM, a citizen of the United States, residing at Muncie, in the county of Delaware and State of Indiana, have invented a certain new and useful Glass-Working Machine, of which the following is a specification.

In the ordinary production of commercial articles from molten glass, more especially hollow glassware, by automatic or semi-automatic machinery, difficulty has been experienced for the reason that portions of the glass forming each article become chilled more than other portions so that the finished article will contain one or more fine hair lines or streaks on the outer surface of the article where two chilled portions of glass have come together and have failed to thoroughly unite. These hair lines do not materially decrease the strength of the articles but they are very noticeable to the eye and are therefore objectionable. It is especially desirable therefore that the glass be introduced into the forming mold under such conditions that there will be a perfect welding of the mass before final forming and such that those portions of the mass which are necessarily chilled by the mold will not be withdrawn from the chilling surface and reworked into the mass during the forming operation. To that end it is desirable that the glass be introduced into the mold directly from the melting furnace or pot and, in order that no time may be lost, it is desirable to permit the glass to flow freely from the melting pot or furnace.

The object of my present invention is to produce a glass handling machine comprising a plurality of molten-glass receivers or molds which may be brought successively into position to directly receive a stream of molten glass flowing from the furnace, mechanism being provided to intermittently sever the flowing stream so that the severed portion will fall into one mold and the oncoming portion will be delivered to a succeeding mold.

In a freely flowing stream of granular material each particle has at any moment a free falling velocity which is not affected by the weight of the stream or the velocity of any other particle, but in a freely flowing stream of molten glass the viscosity of the stream is so great that, as the distance from the point of outflow increases, the diameter of the stream rapidly decreases and the velocity of flow increases (though not as rapidly as in a free falling body) and, as the velocity of flow increases, the temperature remaining substantially constant, the viscosity apparently decreases. On the other hand the entire weight of the stream below any given point is operating on that point to increase its downward velocity and place the stream under tension.

As a result of the weight of a flowing stream of glass said stream is put under tension, like a rubber string, this tension being greatest at the upper end of the stream, but immediately at the mouth of outflow this condition is considerably modified by reason of the adhesion of the molten glass to the wall of the orifice. If the flowing stream be cut at the orifice it is found that the flow is very materially interrupted because there is no weight outside the orifice to operate as a pull upon the outflowing glass, and it is also found that, in the course of time, there will be a chilling of the glass at the orifice to such an extent as to finally prevent outflow so that the chilled glass must be dug out before there can be further operation. On the other hand, if the flowing stream be cut ten or fifteen inches below the orifice, the velocity of the stream at that point is so great, and the viscosity has been so reduced, that it is practically impossible to sever the stream without having the oncoming fresh end pile up on the cutting tool and be chilled thereby so that, when this fresh end passes into the mold, the chilled portion will in most cases result in an objectionable hair-line in the product. In every free flowing stream of glass however, there is a limited range, in most cases about six to eight inches below the orifice, where the elasticity of the stream is so great, and the downward velocity so small, that if the stream be cut within this range, or above it but below the orifice, the upper portion of the stream, immediately above the cutting plane, will draw upwardly as the cut proceeds so that, if the cut be accomplished with a reasonable degree of speed, the severed end will drop away from the cutting tool and the oncoming end will draw upwardly away from the cutting tool so that the chilling action of the cutter upon the stream will be reduced to a minimum. This upward retraction of the freshly cut end of the stream is of course only temporary and, if there is a reasonable weight of material below the orifice the outflow at the orifice will not be materially retarded and the freshly cut end will very quickly proceed downwardly.

My invention, therefore, comprises mechanism for handling a falling stream of glass by severing the same in such a plane relative to the discharge orifice that the elasticity in the stream above the severing plane, due to the weight of the stream below the severing plane, will be greater than the downward velocity of that portion of the stream immediately above the severing plane.

My invention further comprises a cutting and guiding mechanism wherein a deflecting guide is carried by, or associated with, a cutter in such manner that the freshly cut end of a glass stream will be deflected toward an oncoming receptacle.

My invention further comprises such improvements in detail and construction as shall be hereinafter pointed out.

The accompanying drawings illustrate a machine embodying my invention.

Figure 2:
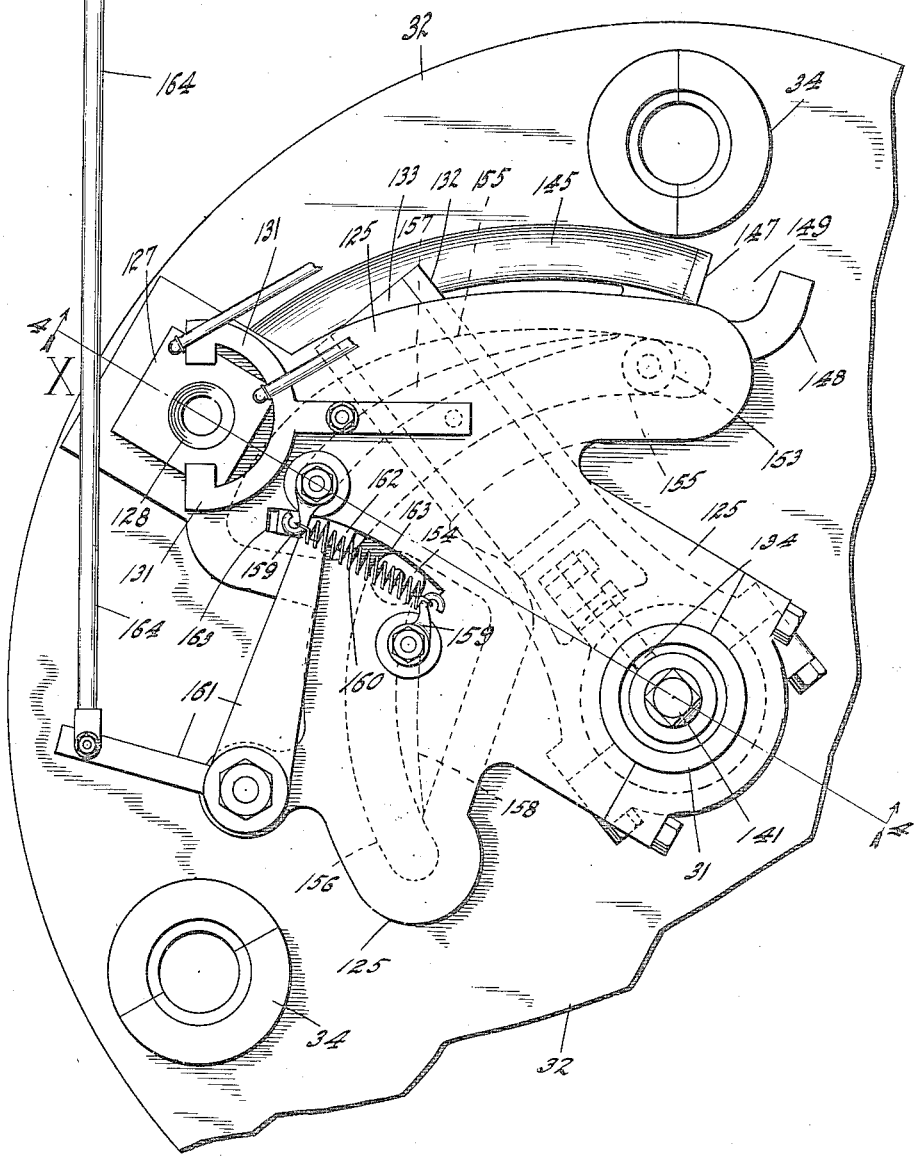

Figure 1 is a side elevation of a machine constructed in accordance with my invention; Fig. 2 a plan, on an enlarged scale, of that portion of the mechanism provided for severing the falling stream and causing the same to be delivered into successive molds or receptacles; Fig. 3 a section on line 3—3 of Fig. 4; Fig. 4 a section on line 4—4 of Fig. 2, with the arm 125 and its associated parts brought into the section plane; Fig. 5 an elevation of the parts shown in Fig. 4; Fig. 6 a fragmentary section on line 6—6 of Fig. 1; Fig. 7 a fragmentary section on line 7—7 of Fig. 1; Fig. 8 a longitudinal vertical section through the glass deflecting runway, showing the stream cutter.

In general the machine is of the type illustrated in my Patent No. 817,745 dated April 17, 1906, and I shall not, therefore, enter into any great detail of description of the parts which are common to the two machines.

In the drawings, 25 indicates a suitable portable support carrying a central hollow pillar 31 upon which is journaled a rotary table 32 which carries a plurality of glass receivers or molds 34. In the machine illustrated these molds 34 are provided with means by which they are automatically opened and closed but it is to be understood that, so far as the major portion of my present invention is concerned, the exact form of the members for receiving the successive portions or masses of molten glass, is wholly immaterial. The table 32 is intermittently advanced step by step by means of an oscillating arm 71 which is journaled on pillar 31, being provided with a spring pawl 72 for successive engagement journaled on pillar 31, being provided with pitman 111 connected to a crank of the main drive shaft 108 so that a rotation of shaft 108 will produce a reciprocation of arm 71 and a consequent forward advancement of table 32 through one step. In the form shown in the drawings the molds 34 are provided with vertically movable press molds 61 each having a downwardly depending stem 62 and these press molds must be intermittently moved up and down into and out of coöperative relation with the molds 34.

Thus far the structure illustrated is identical with that shown in the patent referred to above and I have therefore used the same reference numerals to designate similar parts.

It is the intention that my improved machine be so located with relation to a practically continuous supply of molten glass that the molds or receptacles 34 may be brought directly beneath the discharge orifice of the supply so as to directly receive the flowing stream. I therefore provide the furnace 121 with an overhanging basin 122 having a discharge passage 123 controlled at its outer end by a valve plate 124.

Secured to pillar 31 is an arm 125 having a radial extent about equal to the radius of table 32 and provided near its outer edge with a vertical opening or seat 126 in which is removably mounted a block 127 through which is formed a vertical inverted conical passage 128, said passage being surrounded by a water jacket 129. The block 127 is conveniently held in place by a spring clip or holding fork 131 carried by arm 125 and the lower face of block 127, surrounding the lower end of passage 128, forms one of the shearing blades by means of which the glass stream will be severed.

Reciprocably mounted upon pillar 31 beneath arm 125, is an arm 132 having a radial guideway 133 formed in its upper surface. The arm 132 is oscillated by means of an arm 134 which is carried by a shaft 135 arranged within pillar 31. Arm 134 projects through a slot 136 formed through the wall of pillar 31, and is preferably frictionally connected with shaft 135 in order that the connection with this shaft may yield rather than break the parts which are to be described later. A convenient connection is the conical portion 137 of shaft 135 fitting a correspondingly coned opening in arm 134, the arm being held in place by means of a clamping nut 138 engaging arm 134 and threaded upon a projection 139 carried by shaft 135. The nut 138 is preferably projected upwardly through or to the top of pillar 31 and provided with a squared portion 141 by means of which it may be readily turned with an ordinary wrench.

Slidably mounted in guideway 133 is a block 142 provided on its upper face with a vertical pin 143 upon which is pivotally mounted a plate 144, which plate carries an inclined arc-shaped slide 145, the upper surface of said slide being trough-shaped. The slide 145 is preferably water-jacketed as indicated at 146 and at its upper end terminates in a cutting blade 147 adapted to coöperate with block 127. Arranged beyond the blade 147 is a water-jacketed guard 148 having an opening 149 which is directed radially outward. Beyond the lower end of slide 145 is a water-jacketed guard 151 which however leaves an outwardly directed passage or opening 152, the purpose of which will appear.

Plate 144 carries, upon opposite sides of pivot 143 two rollers or pins 153 and 154. Pin 153 is projected into a cam recess 155 and pin 154 is projected into a cam recess 156, formed in the lower face of the stationary arm 125. Pivoted in recess 155 is a switch tongue 157 and pivoted in recess 156 is a switch tongue 158, these switch tongues being provided in order to control the movement of the pins 153 and 154 in a well known manner.

The two switch tongues 157, 158 extend in opposite directions and the large ends of the two cam recesses 155 and 156 are adjacent. Secured to the pivot pins of the two switch tongues are arms 159 which are connected by a spring 160, said spring normally keeping the two switch tongues in the positions indicated in Fig. 2. In order to shift pins 153 and 154 across the large ends of the two cam recesses, I pivot, upon arm 125, a lever 161 having a T-shaped end 162 which is projected downwardly through an arc-shaped slot 163 formed through arm 125 so as to overlap the adjacent large ends of the two cam recesses. Any suitable means may be provided for intermittently reciprocating lever 161 and in the drawings I have shown said lever connected by a pitman 164 with a crank 165 carried by a rock shaft 166 journaled in brackets 167 on the main frame. This rock shaft is provided with a pair of oppositely projecting curved arms 168 and 169 between which travels a finger 171 reciprocated by means of a connecting rod 172 connected to a crank 173 carried by shaft 108.

Because of the provision of means for automatically delivering the molten glass to the molds, I have found it necessary to make some changes in the structure shown in my previously mentioned patent in order to elevate the press molds 61 at an earlier stage. I therefore provide a vertically moving plunger 174 over which the stems 62 are successively brought, and this plunger 174 is reciprocated by means of a lever 175 controlled by cam 176. When one of the stems 62 has been elevated by plunger 174, a portion 71' of arm 71 will come beneath said freshly elevated stem 62 and, as the table 32 advances, will sustain said stem 62, the arm 71 moving with the table at this time, until said stem is brought immediately over a roller 177 upon which the stem will rest during the next backward reciprocation of arm 71, at the time of completion of which the main portion of the arm 71 will come beneath the said stem and support it during the next forward advancement of the table, the portion 71' at that time supporting a freshly elevated stem 62. In order to keep cutter 147 up so that it will properly coöperate with the lower face of block 127, I provide an arc-shaped track 181 upon which rollers 182, carried by guards 148 and 151, will roll.

The operation is as follows: A stream of glass is allowed to issue and flow freely downward from the discharge orifice of the furnace, the size of the stream being properly regulated by a controlling plate 124. This stream flows downwardly through passage 128 of block 127 at the point X indicated in Figs. 2 and 3, the stream of glass also flowing downwardly through the crotch between the guard 148 and cutter 147. At this time the slide 145, and the structure of which it is a part, occupies the position relative to the table 32, shown in Fig. 3 the upper end of the slide 145 lying near one mold and the lower end of the slide lying immediately over the next rearward mold. When a proper amount of glass has flowed into the mold which is being supplied, arm 132 will be advanced so as to bring the cutter 147 into engagement with the flowing stream and, coöperating with the lower face of block 127, will sever said stream, the lower portion of the stream dropping into the receptacle. The arm 125 is so positioned that the lower face of block 127 will lie below plate 124 only a few inches so that the cutting plane will be within that range of the length of the flowing stream where the elasticity of the stream will exceed its downward velocity, so that, when the stream is severed, the short freshly cut end which remains will retract upwardly slightly from the cutting plane, and, before there is any material downward movement of the stream, the slide 145 will have been brought beneath the depending end of the stream. As soon as the fresh end strikes the slide the glass stream will move rapidly down along the slide and be discharged from the lower end thereof into the next succeeding receptacle which is being advanced toward filling position. The cam recesses 155 and 156 acting on the pins 153 and 154, respectively, will keep the slide 145 immediately beneath the orifice 124 so that the flowing stream will at all times be directed into the new receptacle, but the slide is being constantly moved relative to the flowing stream and less and less of its length is being traversed by the stream until the new receptacle is brought immediately beneath the outflow orifice. The shape of cam recess 155 is such that, as the above described movement takes place, the forward or upper end of slide 145 will move inwardly so as to be drawn away from the filled mold, as fully indicated in Fig. 2, so that a pressing plunger (not shown) may be projected into the filled mold. When the parts have reached the positions shown in Fig. 2, lever 161 will be drawn to the right so that its end 162 will engage pin 154 and drive the same to the right across the large end of the cam recess 156 so that the lower end of the slide 145 will be drawn inwardly, whereupon said slide may be returned to its initial position without interfering with the flow of glass into the new receptacle. When arm 123 is returned to its initial position pins 153 and 154 will pass beneath the switch tongues 157 and 158 respectively and, when pin 153 reaches the large end of cam recess 155, lever 161 will be returned to the position shown in Fig. 2, thus propelling pin 153 across the large end of the cam recess 155 to the initial position shown in Fig. 3, so as to project the slide 145 to the position shown in Fig. 3, where the downwardly flowing glass stream will be passing between cutter 147 and guard 148.

It is to be understood of course that the apparatus might be placed lower than described relative to the downwardly flowing stream, in which case there would be a slight piling of the glass on the rear surface of cutter 147 but this piling action would be very slight indeed because the glass would immediately flow down along the slide 145.

I claim as my invention:

1. In a glass working machine, the combination, with a container for a supply of molten glass and having a discharging outlet from which a flowing stream may be suspended, of a plurality of receptacles, means for successively presenting said receptacles into position to directly receive a stream of glass flowing from said container, severing means adapted to act upon the flowing stream to cut the lower end therefrom, and means for passing said severing means through and from the flowing stream at a cutting plane where the elasticity of the stream exceeds the downward velocity of the glass immediately above the cutting plane.

2. In a glass working machine, the combination with a container for a supply of molten glass and having a discharging outlet from which a flowing stream of glass may be suspended, of a plurality of receptacles, means for successively bringing said receptacles into position to receive the flowing stream, coöperating cutting members arranged upon opposite sides of the flowing stream, and means for driving one of said cutter members across the other and through and beyond the stream at a plane where the elasticity of the fresh end of the stream will exceed its downward velocity and at such speed that the fresh end of the stream will not be supported by the moving cutter.

3. In a glass working machine, the combination, with a container for a supply of molten glass and having a discharging outlet from which a flowing stream of glass may be suspended, of a plurality of receptacles, means for successively bringing said receptacles into position to receive the flowing stream, coöperating cutting members arranged upon opposite sides of the flowing stream at such distance below the suspending outlet that the elasticity of the stream at the cutting plane will be equal to or exceed the downward velocity at said plane, and means for driving one of said cutter members across the other and through and beyond the stream at such speed that the fresh end of the stream will not be supported by the moving cutter.

4. In a glass working machine, the combination, with a container for a supply of molten glass and having a discharging outlet from which a flowing stream may be suspended, of a plurality of receptacles, means for successively presenting said receptacles into position to receive a stream of glass flowing from said container, severing means adapted to act upon the flowing stream to cut the lower end therefrom, means for passing said severing means through and from the flowing stream without supporting the fresh end of the stream, and a downwardly inclined slide extending from the cutter to the oncoming receptacle.

5. In a glass working machine, the combination, with a container for a supply of molten glass and having a discharging outlet from which a flowing stream of glass may be suspended, of a plurality of receptacles, means for successively bringing said receptacles into position to receive the flowing stream, coöperating cutting members arranged upon opposite sides of the flowing stream, means for driving one of said cutter members across the other and through and beyond the stream at such speed that the fresh end of the stream will not be supported by the moving cutter, and a downwardly inclined slide extending from the cutter to the oncoming receptacle.

6. In a glass working machine, the combination, with a container for a supply of molten glass and having a discharging outlet from which a flowing stream of glass may be suspended, of a plurality of receptacles, means for successively bringing said receptacles into position to receive the flowing stream, coöperating cutting members arranged upon opposite sides of the flowing stream at such distance below the suspending outlet that the elasticity of the stream at the cutting plane will be equal to or exceed the downward velocity at said plane, means for driving one of said cutter members across the other and through and beyond the stream at such speed that the fresh end of the stream will not be supported by the moving cutter, and a downwardly inclined slide extending from the cutter to the oncoming receptacle.

7. In a glass working machine, the combination with a plurality of receivers, and means for bringing the same successively into receiving position, of a pair of coöperating cutting members arranged above the plane of travel of the receivers, means for bringing said cutting members together to sever a stream of glass, and a deflector for deflecting without interrupting the fresh end of the stream to an oncoming receptacle.

8. In a glass working machine, the combination with a plurality of receivers, and means for bringing the same successively into receiving position, of a pair of coöperating cutting members arranged above the plane of travel of the receivers, means for bringing said cutting members together to sever a stream of glass, and a deflector carried by one of the cutting members for deflecting the fresh end of the stream to an oncoming receptacle.

9. In a glass working machine, the combination of a carrier carrying a succession of receptacles for molten glass, a cutter member arranged above the plane of the receptacles, a second cutter member adapted to coöperate with the first cutter member to sever a stream of molten glass, a slide adapted to receive the fresh end of the stream and direct the same to an oncoming receiver, and means for moving said slide in the general line of movement of the receptacles, and back to normal position.

10. In a glass working machine, the combination of a carrier carrying a succession of receptacles for molten glass, a cutter member arranged above the plane of the receptacles, a second cutter member adapted to coöperate with the first cutter member to sever a stream of molten glass, a slide adapted to receive the fresh end of the stream and direct the same to an oncoming receiver, and means for moving said slide in the general line of movement of the receptacles and transversely of said line of movement, and back to normal position.

11. In a glass working machine, the combination of a rotary table, a plurality of glass receptacles carried by said table, means for advancing said table, a stationary cutter member arranged above said table, a movable cutter member coöperating with said stationary cutter member, a slide carried by said movable cutter member and adapted to direct the freshly cut end of a glass stream into its succeeding receptacle, and means for moving said slide in the direction of movement of the table for a short distance and then returning said slide to initial position.

12. In a glass working machine, the combination of a rotary table, a plurality of glass receptacles carried by said table, means for advancing said table, a stationary cutter member arranged above said table, a movable cutter member coöperating with said stationary cutter member, a slide carried by said movable cutter member and adapted to direct the freshly cut end of a glass stream into its succeeding receptacle, a carrier for said cutter member and slide, a pivotal connection between said carrier and cutter member, a cam plate engaging said cutter member to move the same raidally relative to the rotary table, an oscillating arm carrying said carrier, and means for oscillating said arm in time with the movement of the table, for the purpose set forth.

13. In a glass working machine, the combination with a container for a supply of molten glass and having a discharging outlet from which a flowing stream may be suspended, of means for receiving successive cut-off portions of the fresh end of such stream and subsequently forming the same, and severing means arranged to act upon the flowing stream to cut the lower end therefrom at a cutting plane where the elasticity of the stream exceeds the downward velocity of the glass immediately above the cutting plane.

In witness whereof, I have hereunto set my hand and seal at Muncie, Indiana, this 10th day of January, A. D. one thousand nine hundred and ten.

ALVAH L. BINGHAM. [L. S.]

Witnesses:
W<small>M</small>. C. D<small>ICKIE</small>,
M<small>ORRIS</small> L. H<small>AGEMAN</small>.